(12) United States Patent
Espeseth et al.

(10) Patent No.: US 6,809,896 B2
(45) Date of Patent: Oct. 26, 2004

(54) POWER-EFFICIENT SEEK OPERATIONS IN HARD DISK DRIVE

(75) Inventors: Adam Michael Espeseth, Rochester, MN (US); David Robison Hall, Rochester, MN (US); Maile Matsui Vasoli, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 364 days.

(21) Appl. No.: 10/097,392

(22) Filed: Mar. 14, 2002

(65) Prior Publication Data

US 2003/0174433 A1 Sep. 18, 2003

(51) Int. Cl.$^7$ .............................................. G11B 5/596
(52) U.S. Cl. ....................... 360/78.07; 711/111; 710/39
(58) Field of Search ........................... 360/78.04, 78.06, 360/78.07, 78.14; 710/39, 40, 5; 711/111, 112, 167, 117

(56) References Cited

U.S. PATENT DOCUMENTS 5,828,902 A * 10/1998 Tanaka et al. ................ 710/39
6,624,964 B1 * 9/2003 Pirzadeh ................... 360/78.07

* cited by examiner

Primary Examiner—Andrew L. Sniezek
(74) Attorney, Agent, or Firm—Patrick Duncan; Dugan & Dugan, PC (57) ABSTRACT

An adaptive maximum seek velocity clipping technique is employed in a disk drive to reduce head movement power requirements. Separate maximum seek velocities are established for respective categories of access commands, where the categories are defined by seek distance and estimated extra latency. The maximum seek velocity established for each category of access commands reflects actual experience in executing access commands of the given category. The maximum seek velocity values for the various categories are stored in a maximum seek velocity table, which is referred to upon execution of access commands. The inventive power-saving technique may be advantageously applied in conjunction with a probability-based shortest access time first (SATF) command queue ordering algorithm.

24 Claims, 7 Drawing Sheets

FIG. 1
(Prior Art)

ESTIMATED EXTRA LATENCY (SERVO ID'S)

| SEEK DISTANCE (CYLINDER GROUPS) | 0-2 | | 3-5 | | 6-8 | | 9+ | |
|---|---|---|---|---|---|---|---|---|
| | MAKE | MISS | MAKE | MISS | MAKE | MISS | MAKE | MISS |
| 0-30 | 4 | 2 | 9 | 0 | 4 | 0 | 72 | 6 |
| 31-91 | 4 | 1 | 6 | 0 | 2 | 0 | 98 | 5 |
| 92-182 | 9 | 7 | 5 | 0 | 4 | 0 | 150 | 4 |
| 183-303 | 27 | 5 | 13 | 1 | 15 | 1 | 208 | 4 |
| 304-454 | 36 | 5 | 16 | 1 | 14 | 4 | 236 | 11 |
| 455-635 | 21 | 10 | 8 | 7 | 15 | 6 | 224 | 14 |
| 636-846 | 23 | 11 | 18 | 2 | 14 | 2 | 153 | 8 |
| 847-1087 | 42 | 13 | 14 | 3 | 10 | 2 | 173 | 6 |
| 1088-1358 | 42 | 13 | 18 | 3 | 17 | 2 | 221 | 8 |
| 1359-1559 | 62 | 19 | 26 | 3 | 30 | 3 | 238 | 7 |
| 1560-1990 | 67 | 25 | 22 | 1 | 22 | 2 | 163 | 3 |

FIG. 2

|  | 0-2 | 3-5 | 6-8 | 9-11 | 12-14 | 15-17 | 18-20 | 21+ |
|---|---|---|---|---|---|---|---|---|
| 0 – 9 | 52 | 19 | 10 | 5 | 0 | 0 | 0 | 0 |
| 10 – 39 | 28 | 11 | 6 | 4 | 0 | 0 | 0 | 0 |
| 40 – 89 | 67 | 8 | 5 | 2 | 1 | 1 | 0 | 0 |
| 90 – 159 | 62 | 5 | 1 | 2 | 1 | 1 | 0 | 0 |
| 160 – 249 | 39 | 0 | 1 | 0 | 0 | 0 | 0 | 0 |
| 250 – 359 | 89 | 12 | 0 | 0 | 0 | 0 | 0 | 0 |
| 360 – 489 | 94 | 50 | 3 | 0 | 0 | 0 | 0 | 0 |
| 490 – 639 | 94 | 69 | 8 | 1 | 0 | 2 | 0 | 0 |
| 640 – 809 | 55 | 11 | 1 | 0 | 1 | 0 | 0 | 1 |
| 810 – 999 | 67 | 18 | 0 | 0 | 0 | 0 | 0 | 1 |
| 1000 – 1209 | 90 | 44 | 9 | 0 | 0 | 0 | 0 | 0 |
| 1210 – 1439 | 100 | 53 | 9 | 0 | 0 | 0 | 0 | 0 |
| 1440 – 1689 | 100 | 94 | 61 | 11 | 2 | 0 | 0 | 0 |
| 1690 – 1959 | 94 | 87 | 48 | 9 | 0 | 0 | 0 | 0 |
| 1960 – 2249 | 100 | 94 | 44 | 6 | 0 | 0 | 0 | 0 |
| 2250 – 2559 | 94 | 86 | 42 | 2 | 1 | 0 | 0 | 0 |
| 2560 – 2889 | 100 | 90 | 44 | 6 | 0 | 0 | 0 | 0 |
| 2890 – 3239 | 92 | 88 | 40 | 20 | 0 | 0 | 0 | 0 |
| 3240 – 3609 | 100 | 84 | 42 | 6 | 1 | 0 | 0 | 1 |
| 3610 – 3999 | 93 | 73 | 33 | 2 | 1 | 0 | 0 | 0 |
| 4000 – 4409 | 100 | 91 | 41 | 5 | 0 | 0 | 0 | 0 |
| 4410 – 4839 | 100 | 66 | 29 | 6 | 0 | 0 | 0 | 5 |
| 4840 – 5289 | 85 | 57 | 15 | 0 | 0 | 0 | 0 | 0 |
| 5290 – 5759 | 92 | 55 | 2 | 0 | 0 | 0 | 0 | 0 |
| 5760 – 6249 | 90 | 52 | 7 | 1 | 0 | 0 | 0 | 0 |
| 6250 – 6759 | 85 | 29 | 1 | 0 | 0 | 0 | 0 | 0 |
| 6760 – 7289 | 62 | 5 | 0 | 0 | 0 | 0 | 0 | 7 |
| 7290 – 7839 | 52 | 21 | 3 | 0 | 0 | 0 | 0 | 0 |
| 7840 – 8409 | 20 | 5 | 0 | 1 | 0 | 0 | 0 | 2 |
| 8410 – 8999 | 4 | 9 | 4 | 3 | 0 | 5 | 4 | 4 |

|  | 0-2 | 3-5 | 6-8 | 9-11 | 12-14 | 15-17 | 18-20 | 21+ |
|---:|---:|---:|---:|---:|---:|---:|---:|---:|
| 0 – 9 | 255 | 255 | 255 | 255 | 191 | 188 | 186 | 19 |
| 10 – 39 | 255 | 255 | 255 | 220 | 107 | 160 | 237 | 6 |
| 40 – 89 | 255 | 255 | 255 | 80 | 244 | 149 | 61 | 188 |
| 90 – 159 | 255 | 255 | 4 | 0 | 96 | 58 | 188 | 34 |
| 160 – 249 | 255 | 43 | 54 | 78 | 203 | 182 | 23 | 136 |
| 250 – 359 | 255 | 255 | 66 | 205 | 45 | 249 | 195 | 84 |
| 360 – 489 | 255 | 255 | 162 | 213 | 137 | 251 | 246 | 245 |
| 490 – 639 | 255 | 255 | 255 | 77 | 72 | 110 | 43 | 108 |
| 640 – 809 | 255 | 255 | 207 | 91 | 39 | 86 | 192 | 241 |
| 810 – 999 | 255 | 255 | 62 | 149 | 23 | 255 | 211 | 179 |
| 1000 – 1209 | 255 | 255 | 255 | 98 | 159 | 158 | 187 | 6 |
| 1210 – 1439 | 255 | 255 | 255 | 35 | 204 | 242 | 137 | 161 |
| 1440 – 1689 | 255 | 255 | 255 | 255 | 14 | 5 | 255 | 132 |
| 1690 – 1959 | 255 | 255 | 255 | 255 | 232 | 255 | 255 | 26 |
| 1960 – 2249 | 255 | 255 | 255 | 230 | 100 | 255 | 255 | 26 |
| 2250 – 2559 | 255 | 255 | 255 | 165 | 158 | 198 | 255 | 255 |
| 2560 – 2889 | 255 | 255 | 255 | 242 | 255 | 108 | 255 | 96 |
| 2890 – 3239 | 255 | 255 | 255 | 255 | 61 | 255 | 91 | 255 |
| 3240 – 3609 | 255 | 255 | 255 | 255 | 123 | 255 | 255 | 74 |
| 3610 – 3999 | 255 | 255 | 255 | 88 | 145 | 98 | 255 | 255 |
| 4000 – 4409 | 255 | 255 | 255 | 245 | 255 | 255 | 255 | 255 |
| 4410 – 4839 | 255 | 255 | 255 | 250 | 255 | 153 | 255 | 116 |
| 4840 – 5289 | 255 | 255 | 255 | 255 | 168 | 255 | 255 | 255 |
| 5290 – 5759 | 255 | 255 | 178 | 255 | 255 | 255 | 255 | 255 |
| 5760 – 6249 | 255 | 255 | 255 | 188 | 255 | 255 | 255 | 88 |
| 6250 – 6759 | 255 | 255 | 222 | 255 | 255 | 255 | 255 | 255 |
| 6760 – 7289 | 255 | 255 | 255 | 255 | 255 | 255 | 255 | 19 |
| 7290 – 7839 | 255 | 255 | 239 | 255 | 255 | 255 | 255 | 255 |
| 7840 – 8409 | 255 | 255 | 255 | 223 | 255 | 255 | 255 | 236 |
| 8410 – 8999 | 239 | 225 | 105 | 103 | 255 | 177 | 177 | 91 |

POWER-EFFICIENT SEEK OPERATIONS IN HARD DISK DRIVE

FIELD OF THE INVENTION

The present invention relates generally to the data processing field, and, more particularly, relates to a technique for conserving power in operation of a hard disk drive.

BACKGROUND OF THE INVENTION

Figure 1:
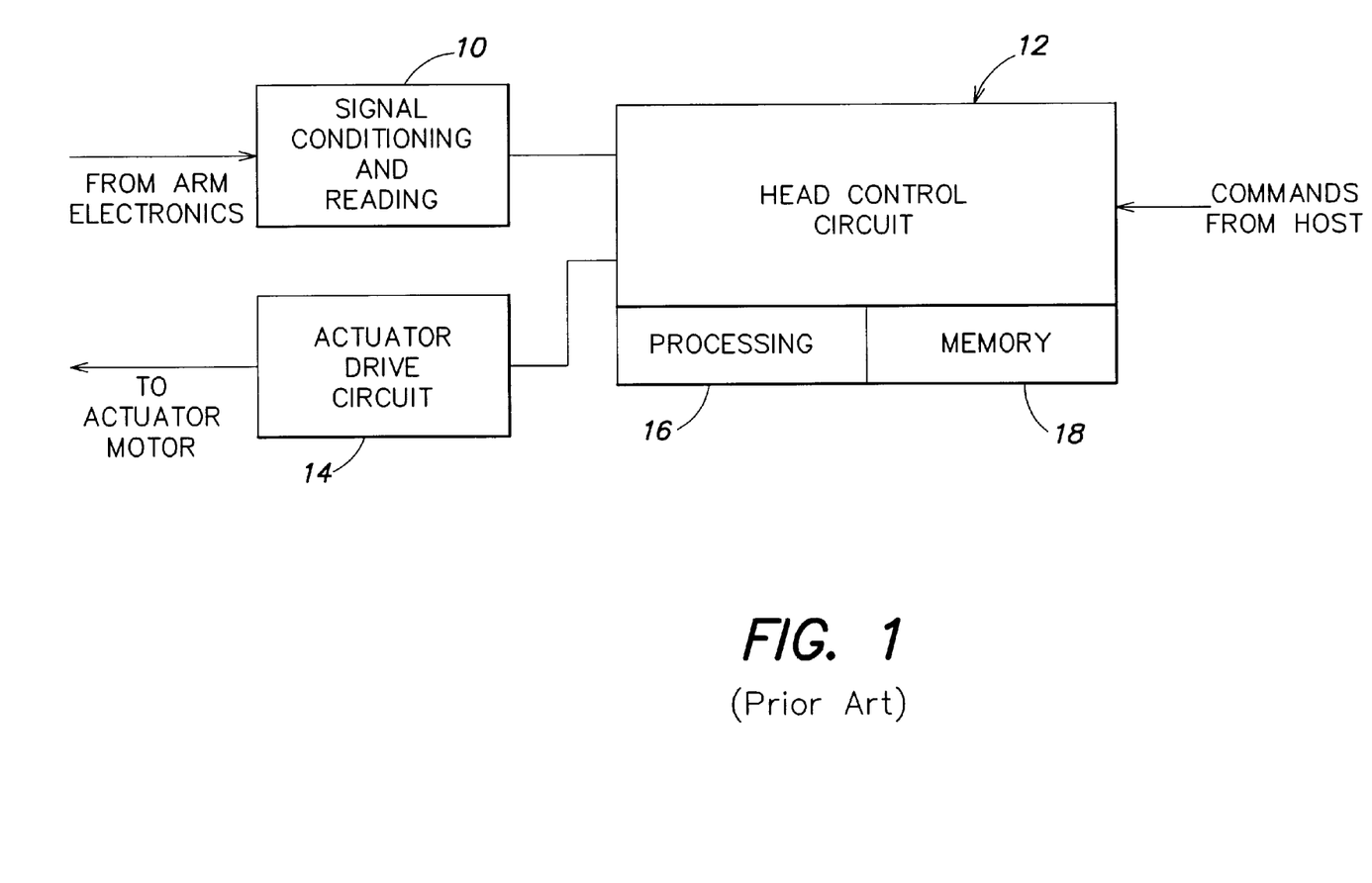
FIG. 1 is a block diagram of a conventional circuit arrangement for controlling positioning of a head in a disk drive.

In a hard disk drive, data signals are read from and written to a rotating disk by a head which is moved substantially radially with respect to the disk. FIG. 1 is a simplified block diagram that illustrates conventional circuitry which controls the positioning of a head in a disk drive. Signal conditioning and reading circuitry 10 receives an input signal from arm electronics, which are not shown. A signal output from the signal conditioning and reading circuitry 10 is provided to a head control circuit 12. The head control circuit 12 processes the signal received from the signal conditioning and reading circuitry 10 and outputs a control signal to an actuator drive circuit 14. The actuator drive circuit 14 provides a driving signal to a head actuator motor (not shown) which typically is a voice coil motor (VCM).

The head control circuit 12 also receives commands from a host system, which is not shown. The head control circuit 12 includes a processing capability 16, which may include one or more processors. Also included in the head control circuit 12 are one or more memory units, represented by memory block 18 in FIG. 1.

The head control circuit 12 responds to commands from the host by moving the head from a current position to a target position. Such operations are referred to as "seeks", and are intended to bring the head into a stable position at a target track or cylinder.

According to conventional practices, commands from the host may be queued in the head control circuit 12, and may be selected from the queue for execution in accordance with a process intended to minimize the average access time for execution of commands. According to a known command queue ordering technique, a Shortest Access Time First (SATF) algorithm is employed. According to this algorithm, the command selected for execution from the command queue is that which can be started first. Estimated access times for commands are contained in a seek profile table stored in the memory 18. The estimated access times indicated by the seek profile table take two factors into account: (a) the time required to seek to and settle at the target track, and (b) the additional time required for the disk to rotate so that the target sector reaches the locus of the head. This additional rotational time is sometimes referred to as "extra latency".

When a command fails to be executed within the estimated access time indicated by the seek profile table, execution of the command must await an additional rotation of the disk. This phenomenon can degrade the performance of the disk drive, and is referred to as a "miss". A command may fail to execute within the estimated access time indicated by the seek profile table as a result of factors such as variations in temperature, variations in head position, and external vibration.

The SATF algorithm has been modified according to an invention that is commonly assigned herewith and referred to as DEAT (Delta Expected Access Time). The DEAT SATF algorithm is disclosed in co-pending commonly-assigned patent application Ser. No. 09/638,253, filed Aug. 14, 2000 now U.S. Pat. No. 6,725,327. That patent application is incorporated herein by reference.

Figure 2:
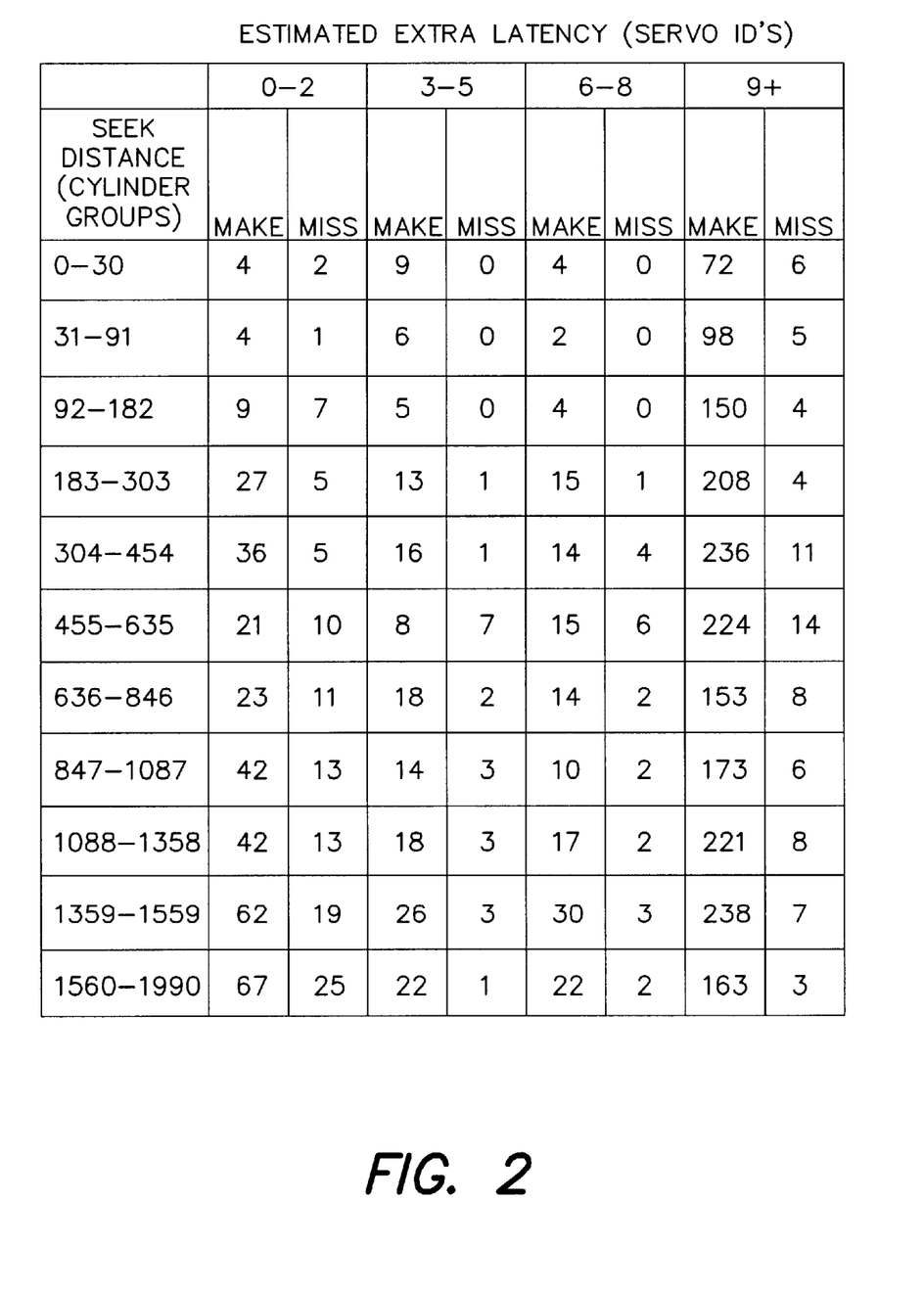
FIG. 2 is an example of a probability table used in connection with selection of access commands from a command queue in a disk drive.

In selecting a command for execution from the command queue, the DEAT SATF algorithm considers not only the estimated access time indicated by the seek profile table, but also the probability that the command will be executed within the estimated time. The probability information may be based on actual experience in executing commands, as indicated by a probability table. A simplified example of a probability table provided according to the DEAT SATF algorithm is shown in FIG. 2. The probability table of FIG. 2 indicates execution experience for executed commands that have been categorized according to seek distance and estimated extra latency. The seek distance is measured in terms of cylinder groups, and the estimated extra latency is measured in terms of servo ID's. In FIG. 2, four columns are shown, corresponding to four extra latency bands, and eleven rows are shown, corresponding to cylinder groups. For each category of commands, the number of misses and the number of "makes" (occasions on which the command executed within the expected time) are recorded.

Figure 2A:
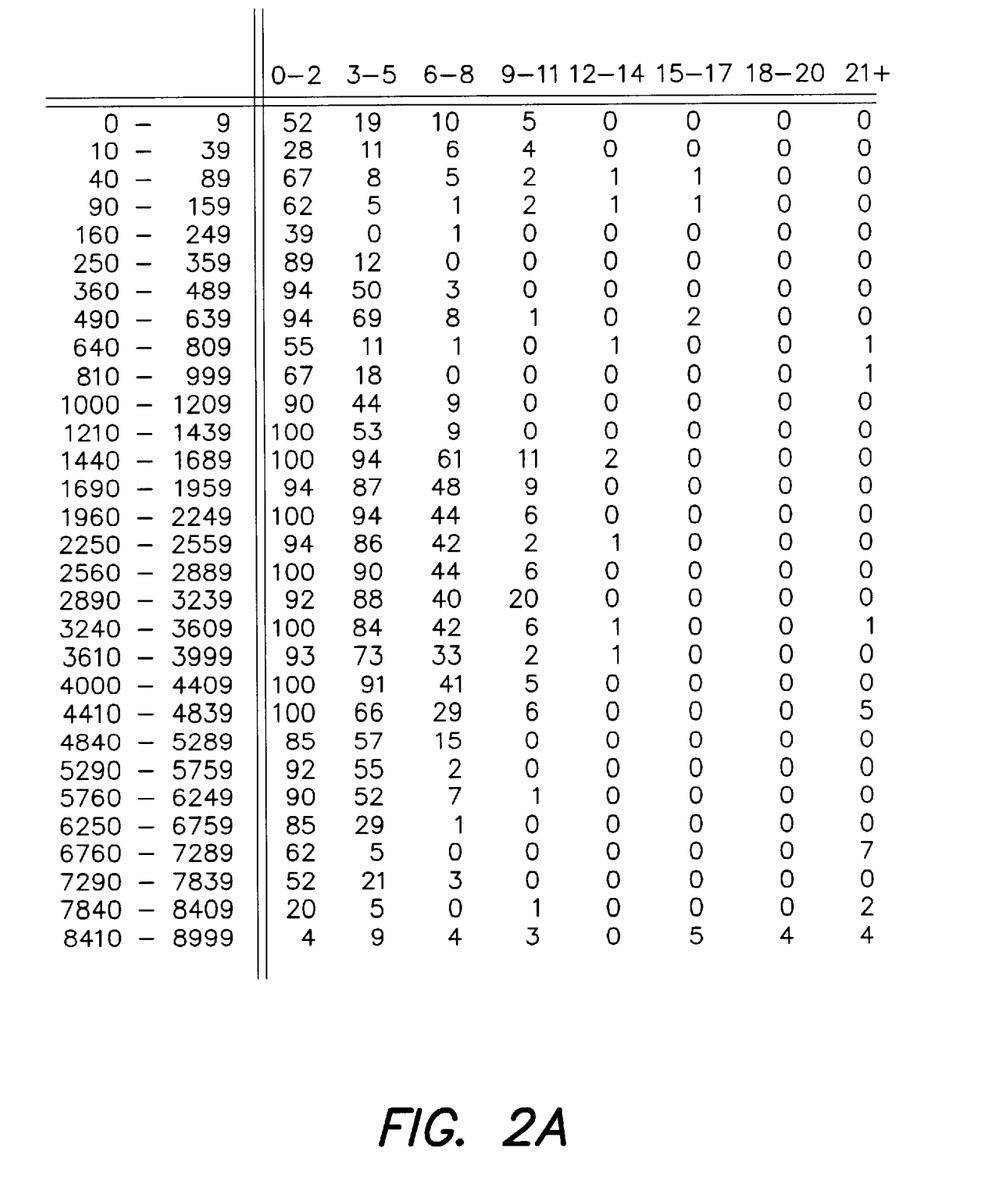
FIG. 2A is another example of a probability table used in connection with selection of access commands from a command queue in a disk drive.

FIG. 2A is another example of a probability table used for the DEAT SATF algorithm, this time presenting data gathered from an actual implementation of the DEAT SATF algorithm. In contrast to FIG. 2, the table of FIG. 2A expresses the command execution experience in terms of percentages corresponding to miss rates. That is, the cell entries in FIG. 2A are derived by dividing the number of misses for each category by the total of makes and misses for the category. It will also be observed that the table of FIG. 2A has 240 categories, corresponding to 30 cylinder groups by eight extra latency bands. It should also be noted that in the data shown in FIG. 2A, for a given category or cell, a miss rate of zero is recorded when the total of makes and misses for that category is less than 10.

Power consumption may be a consideration in driving a head actuator. In many conventional disk drives, the head is driven to the target cylinder as rapidly as possible, without regard to the estimated extra latency for the command in question. This technique may use more power than is necessary to perform the command without incurring a miss. Power is used by the VCM only while accelerating or decelerating the actuator. To the extent that the head arrives at the target track prior to the target sector in the track rotating to the head locus, power is theoretically wasted.

One technique for reducing the amount of power consumed in driving the head actuator is to reduce (or "clip") the maximum velocity of the actuator. This reduces the amount of acceleration and deceleration during seek operations, thereby reducing the amount of current drawn by the VCM. However, if the maximum seek velocity is reduced across the board, performance of the disk drive is adversely affected.

It could be contemplated to select a command for execution from the command queue based on considerations of power consumption, e.g., by giving priority to commands which require less power, but this would tend to adversely affect performance.

According to another power saving technique, two seek profile tables are provided, with one of the tables corresponding to a full power maximum seek velocity, and the second table corresponding to a lower power (lower maximum velocity). In operation with the two seek profile tables, the high power seek profile table and an associated probability table are employed in accordance with the DEAT SATF algorithm to select a command for execution from the command queue. Then, the corresponding entry in the lower power seek profile table is consulted to determine whether the selected command can also be expected to execute on time if constrained by the lower maximum velocity. If it is determined that the selected command will likely be executed on time even if executed at lower power, then the lower maximum velocity constraint is applied. Otherwise, the lower maximum velocity constraint is not applied.

This technique provides some savings in power without adversely affecting performance, but requires substantial memory space for storing the additional seek profile table. Furthermore, power savings are less than optimal, since the number of power levels is limited to the number of seek profile tables, and the number of seek profile tables that may be practically provided is limited by memory constraints.

It would be desirable to provide a technique for controlling head actuation that provides a greater reduction in power consumption without adversely affecting performance of the disk drive.

SUMMARY OF THE INVENTION

According to an aspect of the invention, a method of operating a disk drive is provided. The method according to this aspect of the invention includes receiving an access command and determining a category of the access command based on a seek distance and an estimated extra latency for the access command. The method further includes looking up a maximum seek velocity that corresponds to the determined category of the access command, and performing a seek operation in response to the access command and subject to the looked-up maximum seek velocity.

In at least one embodiment, the maximum seek velocity may be looked up in a table that provides different respective maximum seek velocities for different seek distance/ estimated extra latency categories of access operations. The seek distance may be represented in terms of cylinder bands and the estimated latency may be represented in terms of servo ID bands. The access command may be a read command or a write command.

The method may further include selecting the access command from a command queue prior to the looking-up step. In at least one embodiment, the access command may be selected from the command queue in accordance with an SATF algorithm. The SATF algorithm may be of a type that takes into account an estimated probability that the access command can be performed within an estimated access time.

According to a second aspect of the invention, another method of operating a disk drive is provided. The method according to this aspect of the invention includes storing a plurality of different maximum seek velocities in a table, where the stored maximum seek velocities are indexed by parameters of access operations. The method further includes receiving an access command, determining parameters of the received access command, and selecting one of the stored maximum seek velocities from the table based on the determined parameters of the received access command. The method further includes performing a seek operation in response to the received access command and subject to the selected maximum seek velocity.

In at least one embodiment, the parameters of access operations and the determined parameters of the received access command may include seek distance and estimated extra latency.

According to a third aspect of the invention, a method of establishing respective maximum seek velocities for categories of access commands is provided. The method includes maintaining statistics for each of the categories of access commands, where the statistics indicate a number of occasions on which access commands of the respective category were performed within an estimated access time and the statistics also indicate a number of occasions on which access commands of the respective category failed to be performed within the estimated access time. The method further includes deriving a performance rate for each category of access commands from the statistics for the respective category, and performing an access operation associated with a specific one of the categories of access commands. The method further includes comparing the performance rate for the specific one of the categories of access commands with a threshold, and determining whether to increase, or determining whether to decrease, a respective maximum seek velocity for the specific one of the categories of the access commands based on a result of the comparing step.

According to a fourth aspect of the invention, a memory device storing a maximum seek velocity table is provided. The table contains a plurality of cells. Each of the cells hold a maximum seek velocity value for constraining execution of a category of access commands which corresponds to the respective cell. The cells are defined by a plurality of estimated extra latency bands and a plurality of seek distance bands.

The present invention adapts maximum seek velocities to respective categories of access commands based on actual experience in executing access commands of the respective category. In this way, a maximum seek velocity is adopted for each category at a level which is not likely to adversely affect performance of the disk drive. At the same time, optimum savings in power are achieved, since a different optimal maximum seek velocity is provided for each category of access commands.

Other objects, features and advantages of the present invention will become more fully apparent from the following detailed description of exemplary embodiments, the appended claims and the accompanying drawings.

DETAILED DESCRIPTION

The present invention provides savings in the power expended in driving the disk drive head by selectively reducing a maximum seek velocity for at least some categories of access operations. In one embodiment, the maximum seek velocities are adaptively adjusted to reflect experience in executing access operations in each category. The maximum seek velocities that are established for each category of access command are stored in a table. The table may be consulted each time a command is selected for execution. The maximum seek velocity value stored for the category corresponding to the selected command is used to limit the seek velocity employed in executing the selected command. It will be understood that access operations include either reads or writes.

Figure 3:
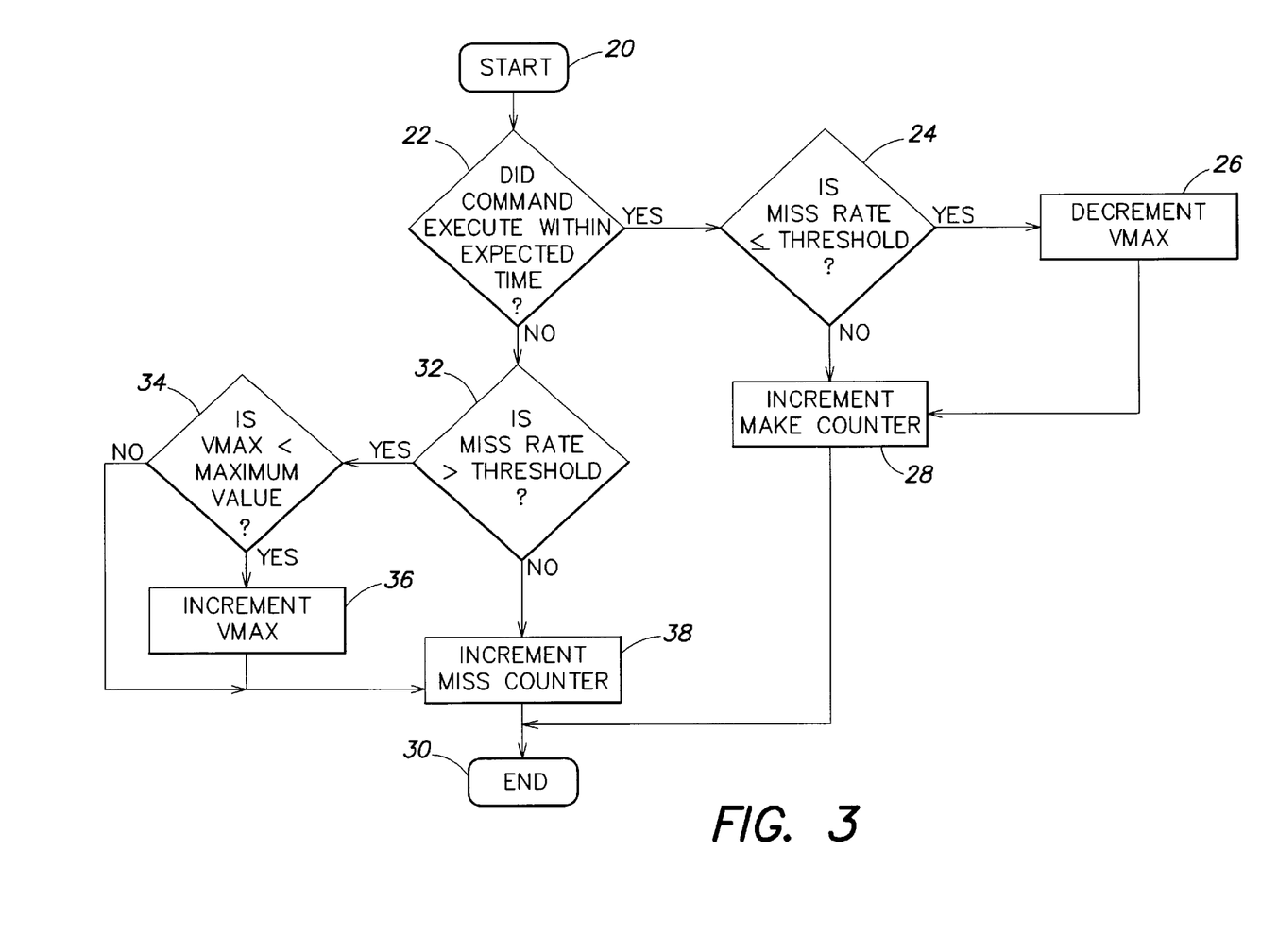
FIG. 3 is a flow chart that illustrates a method provided in accordance with the invention for setting a maximum seek velocity for a category of access commands.

FIG. 3 is a flow chart that illustrates a procedure carried out in accordance with the invention to adjust the maximum seek velocity for a category of access commands on the basis of experience in executing commands in that category.

The procedure of FIG. 3 starts at block 20. It is assumed that an access command in a particular category defined by seek distance and estimated extra latency has been selected and executed. It is then determined, at block 22, whether the command was executed within the expected time for the command, where the expected time was determined by reference to a seek profile table. It is to be understood that the seek profile table is generated based on the assumption that all commands will be executed using a global maximum seek velocity, which is typically set to be the highest velocity at which the head actuator can operate without damage to the device or excessive wear.

If a positive determination is made at decision block 22, that is, if the access command was executed within the expected time, then decision block 24 follows. At decision block 24, it is determined whether the current miss rate for the category of access commands is less than or equal to a threshold. The miss rate for the category is, as noted above, a statistic that indicates a proportion of the time that execution of previous commands in the category resulted in misses. The miss rate may be looked up directly in a probability table of the kind illustrated in FIG. 2A, or may be calculated from the make and miss statistics contained in a probability table having the format shown in FIG. 2. The threshold may be selected to represent an acceptable miss rate, e.g., a miss rate that does not appreciably degrade performance of the disk drive. In one embodiment, the threshold is selected as the average miss rate for the cells in the last column of the probability table of FIG. 2A, or the last few columns of the probability table of FIG. 2A, but without considering any cells for which a zero miss rate is recorded because an insufficient number of commands (say less than 10 commands) have been executed in the category represented by the respective cell. In one embodiment of the invention, for example, the threshold was selected to be three percent, but other threshold levels are contemplated.

If a positive determination is made at decision block 24, i.e. the miss rate for the category of access commands is less than the threshold, then the maximum seek velocity (Vmax) for the category of access commands is decremented (block 26). Following block 26 (or directly following decision block 24 if a negative determination is made at decision block 24) is block 28. At block 28, a counter that keeps track of occasions in which a command in the relevant category is executed within the expected time (i.e. is a "make") is incremented. (It will be appreciated that examples of make counters are shown in the probability table of FIG. 2.)

Following block 28, the procedure ends (30). It should be noted that block 28 may be performed prior to decision block 24.

Considering again decision block 22, if a negative determination is made at that decision block (i.e. if the access command failed to be executed within the expected time, resulting in a "miss"), decision block 32 follows decision block 22. At decision block 32 it is determined whether the miss rate is greater than the threshold. If so, decision block 34 follows. At decision block 34, it is determined whether the maximum seek velocity currently stored for the category of access commands is less than the global maximum seek velocity. If so, the value of the maximum seek velocity for the category of access commands is incremented (block 36). Following block 36 is block 38, at which a miss counter for the category of access commands is incremented. (Alternatively, block 38 may immediately follow decision block 32 if a negative determination is made at decision block 32, or block 38 may immediately follow block 34 if a negative determination is made at decision block 34.) The procedure of FIG. 3 ends (at 30) after block 38. It should be noted that the incrementing of the miss counter (block 38) may occur prior to decision block 32.

To summarize the effects of the procedure of FIG. 3, when a command is executed within an expected time and if the miss rate for the relevant category of command is below a threshold, then the maximum seek velocity which governs seek operations for access commands in that category is decreased. Contrariwise, if the execution of the access command results in a miss, and if the miss rate is greater than the threshold, then the maximum seek velocity for the relevant category of access commands is increased. The experience statistics (cumulative makes and misses) for the category of access commands are also updated. The overall effect of the procedure of FIG. 3 is to drive the maximum seek velocity for the category of commands to the threshold. As noted before, the threshold may be selected so that no significant degradation of disk drive performance occurs.

Figure 3A:
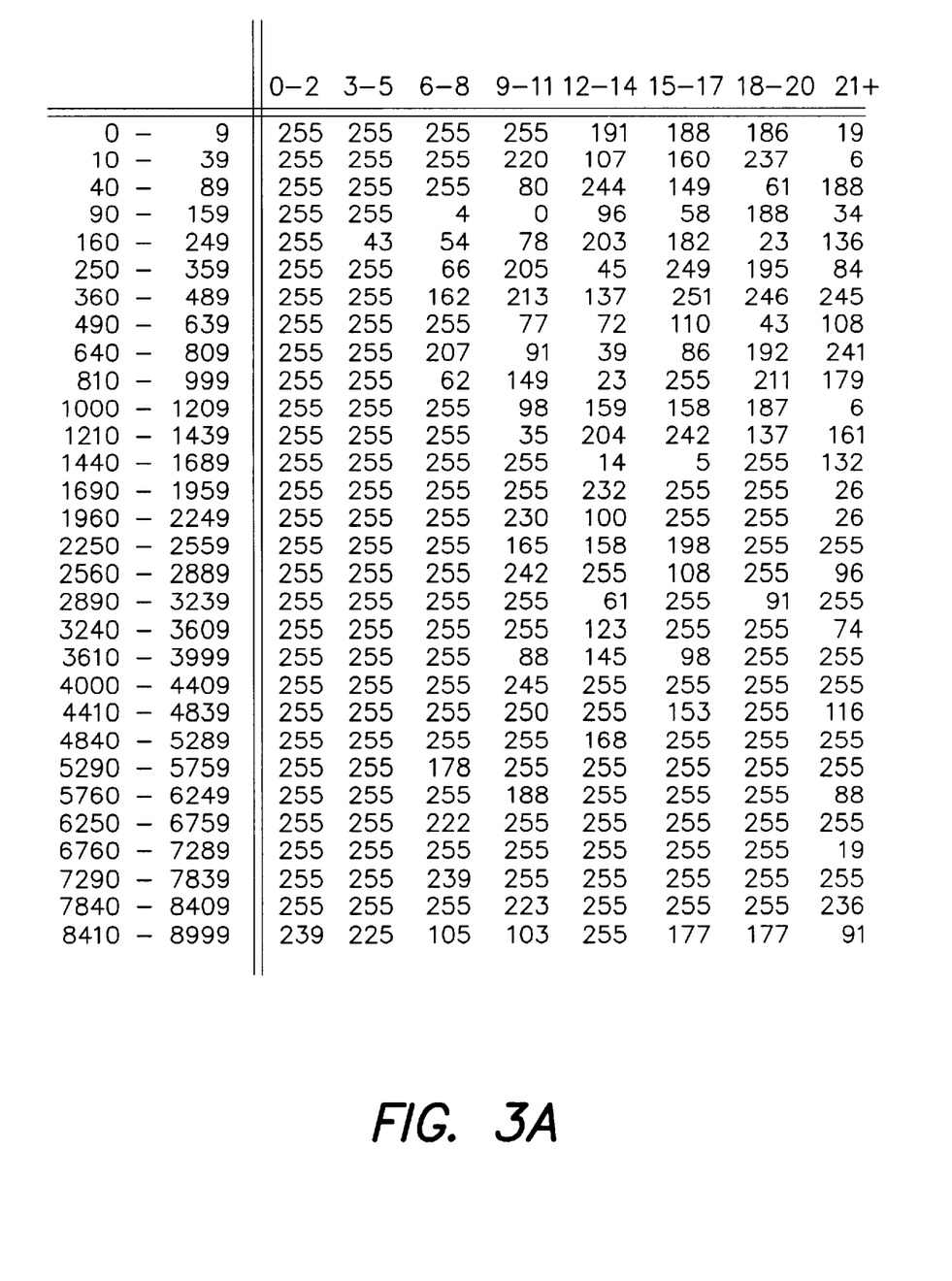
FIG. 3A is an example of a table of maximum seek velocity values corresponding to respective categories of access commands.

The respective maximum seek velocities for each category of access command, as established over time by the process of FIG. 3, are stored in a maximum seek velocity table (Vmax table) like that illustrated in FIG. 3A. In the exemplary Vmax table of FIG. 3A, maximum seek velocity values are stored for each category of access commands, where the access command categories are defined by eight estimated extra latency bands and thirty cylinder groups (i.e., the same format as the probability table as FIG. 2A). In the exemplary Vmax table of FIG. 3A, eight bits are provided for storing the maximum seek velocity value for each category, corresponding to a range of Vmax values of 0–255. The maximum value, 255, corresponds to the global maximum seek velocity allowed for the head actuator. The minimum value, zero, corresponds to the lowest maximum seek velocity which is to be allowed for any category of access commands. A minimum allowable value of Vmax may be provided so that the movement of the head actuator cannot be constrained to a zero velocity.

It will be appreciated that a Vmax table like that shown in FIG. 3A may be stored, in accordance with the invention, in the memory 18 of the head control circuit 12 (FIG. 1). It is contemplated to save space in the storage of the Vmax table by, for example, assuming that the global maximum seek velocity applies to all categories in the first two or three columns, and accordingly not storing any entries for the first two or three columns. In one embodiment of the invention, the initial value of Vmax for the operation of the procedure of FIG. 3 is set to the maximum value and the Vmax table entries are accordingly all initialized to the maximum value (255 in the example of FIG. 3A). Then, based on actual experience in executing access commands, the Vmax values for the various categories are decreased up to the point where any further decrease in Vmax may begin to adversely affect performance.

In one embodiment of the invention, not illustrated in FIG. 3A, upon decrementing the Vmax value in one cell of the Vmax table, each entry in the cells to the right in the same row are also decremented, so that no cell holds a Vmax value that is higher than the value in the cell to its left. Intuitively, it will be recognized that a Vmax value that is suitable for one category of access commands, must be at least acceptable for other categories corresponding to the same cylinder group and larger estimated extra latencies. This feature tends to more rapidly move values of Vmax stored in the Vmax table toward the lowest acceptable Vmax level. (As noted before, this feature is not illustrated in the exemplary Vmax table of FIG. 3A.)

Although a two dimensional Vmax table is illustrated in FIG. 3A (the two dimensions being estimated latency and seek distance), it is contemplated to add one or more additional dimensions to the Vmax table, such as head position or seek direction. However, satisfactory results have been obtained with a two dimensional Vmax table like that shown in FIG. 3A.

Figure 4:
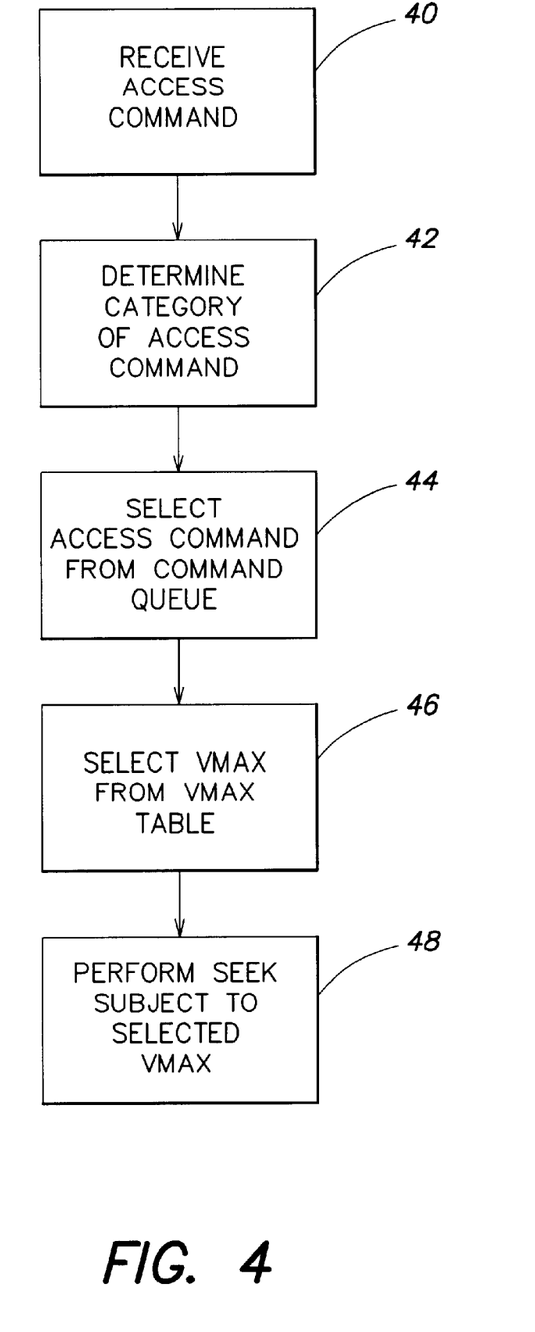
FIG. 4 is a flow chart that illustrates a process for selecting a maximum seek velocity from a table of the type illustrated in FIG. 3A.

FIG. 4 is a flow chart that illustrates a process carried out in accordance with the invention for performing access operations subject to maximum seek velocities contained in a Vmax table like the table of FIG. 3A. The procedure of FIG. 4 begins with a block 40 at which an access command is received by the head control circuit 12 (FIG. 1) from the host system. Next, at block 42, the category of the access command is determined. As will be appreciated from previous discussion, the category of the access command may be determined based on seek distance (e.g. measured in cylinder groups) and estimated extra latency (e.g. measured in servo ID's). Shown next in FIG. 4 is block 44, at which the access command is selected from the command queue. It will be understood that there may be a delay between step 40 and steps 42 and 44, while other, higher priority (shorter access time) commands are selected for execution before the access command which was received at block 40.

Following block 44 is block 46. At block 46 the applicable maximum seek velocity (Vmax) for the category to which the selected access command belongs is selected from the Vmax table. That is, the corresponding Vmax value for the category of the selected access command is looked up in the Vmax table.

Following step 46 is step 48. At step 48 a seek operation is performed to carry out the selected access command, but subject to the maximum seek velocity value selected from the Vmax table at block 46.

It is to be noted that each of blocks 40, 42 and 44 in FIG. 4 may be performed in accordance with the DEAT SATF command queue ordering procedure that was described above. Alternatively, selection of the command from the command queue may be performed in accordance with an SATF algorithm that does not employ DEAT. As still another alternative, the received access command may be unqueued (e.g., no command queue is maintained) in which case block 44 may be omitted.

Figure 5:
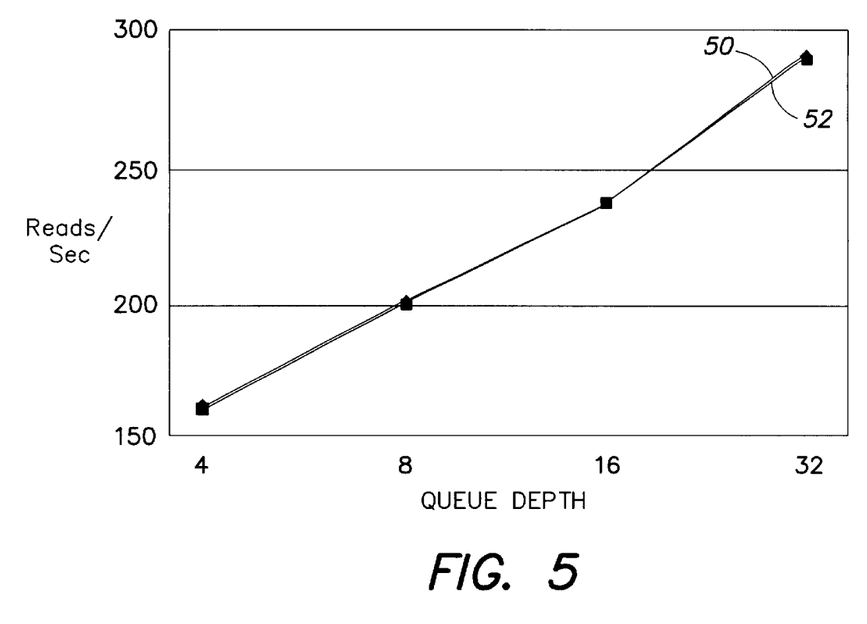
FIG. 5 graphically illustrates a comparison of respective operating results for the head drive technique of the present invention and for a conventional technique.

FIG. 5 represents a graphical comparison of operating results obtained, respectively, in a hard disk drive operated with the power-saving technique of the present invention, and a hard disk drive operated in accordance with conventional practice, and without any power saving feature (i.e., with a global maximum seek velocity selected only to preserve operability of the disk drive). The vertical scale in FIG. 5 represents read operations performed per second, a measure of disk drive performance. The horizontal scale represents queue depth, i.e., the number of access commands held in the command queue from which a current access command is selected for execution. Two nearly coinciding data curves are shown in FIG. 5, including a data curve 50 (with diamond-shaped data points) representing performance results obtained in a disk drive operated in a conventional fashion, and a data curve 52 (with square-shaped data points) representing operation of the disk drive in accordance with the inventive power-saving feature.

The results shown in FIG. 5 were obtained in both instances using a commercially available 36 gigabyte hard disk drive from the Ultrastar 73 LZX line of disk drive products available from IBM, the assignee of this invention. To obtain the results indicated for the inventive process, the commercially available disk drive was modified by reprogramming the head control electronics in accordance with the invention. The exercises which produced the data shown in FIG. 5 were conducted at "full volume" (i.e. extended over the entire cylinder range of the disk drive) and consisted of one-sector random read operations. For the purpose of the inventive process represented by data curve 52, a miss rate threshold for decreasing or increasing Vmax (as referred to in connection with blocks 24 and 32 of FIG. 3) was set at 3%, which was estimated to be the "background" miss rate for the disk drive.

It will be observed that the data curves 50 and 52 are nearly identical, indicating essentially no loss of performance from the inventive power-saving feature utilizing selectively reduced maximum seek velocities versus the conventional operation in which a uniformly high maximum seek velocity was employed.

Figure 6:
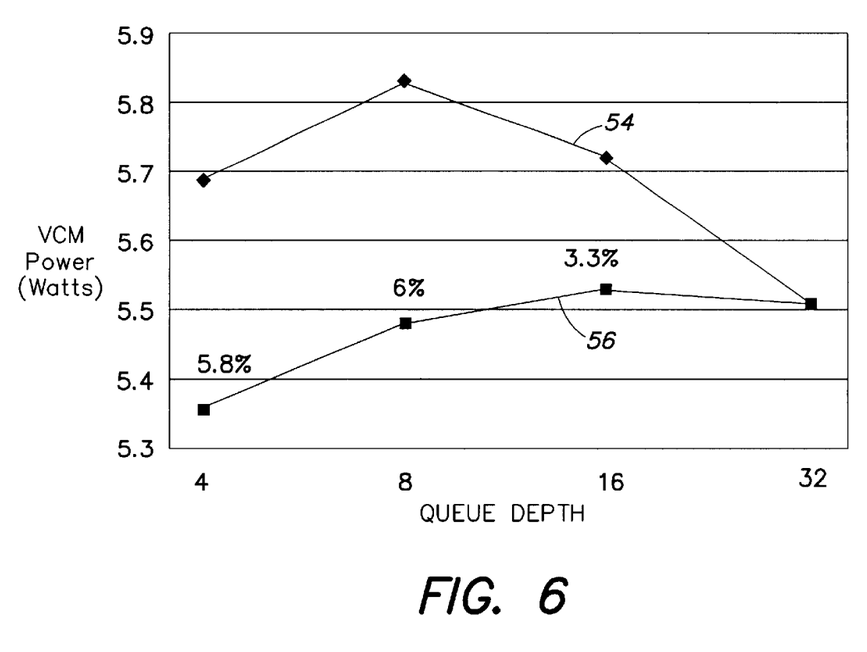
FIG. 6 graphically illustrates a comparison of respective power consumption data for the inventive technique and for the conventional technique referred to in connection with FIG. 5.

FIG. 6 illustrates the savings in seek operation power achieved with the inventive power-saving feature of the present invention versus the conventional mode of operation. The results indicated in FIG. 6 were obtained from the same experimental exercises as those referred to in connection with FIG. 5. In FIG. 6, the data curve 54 (with the diamond-shaped data points) indicates the seek power consumption for the disk drive when operated in a conventional manner. The data curve 56 (with the square-shaped data points) indicates the seek power consumption of the disk drive when operated with the power-saving feature of the present invention. It will be noted that the data curve 56 shows reduced power consumption for queue depths at the 4, 8 and 16 levels, with a substantially 6% reduction in power consumption at a queue depth of 8. This approaches a one-half watt saving in power, which is significant. It can be expected that even greater power savings would be realized for performance of unqueued access commands, because of the, on average, longer seek distances and greater extra latencies involved with unqueued operation.

To summarize conclusions that can be drawn from the data illustrated in FIGS. 5 and 6, the adaptive maximum seek velocity clipping technique of the present invention produces substantial savings in seek power expenditure. Another advantage of the inventive power-saving technique is that it can piggy-back on the probability data used for the DEAT SATF process while adding only a Vmax table, which requires relatively little additional memory space. Instead of using a separate Vmax table, it is contemplated to set aside bits for storing Vmax values in the cells of a probability table like that of FIG. 2A. If the Vmax table is maintained separately from the probability table, the Vmax table may, but need not, have the same dimensions as the probability table.

The foregoing description discloses only exemplary embodiments of the invention; modifications of the above disclosed apparatus and methods which fall within the scope of the invention will be readily apparent to those of ordinary skill in the art. For example, although the invention has primarily been described in use together with a DEAT SATF command queue ordering algorithm, it is also contemplated to use the invention in connection with an SATF algorithm that does not employ DEAT, or in a disk drive that dispenses entirely with SATF. In the latter two cases, it may be necessary to maintain a probability table for Vmax adaptation like the tables shown in FIGS. 2 and/or 2A.

Accordingly, while the present invention has been disclosed in connection with exemplary embodiments thereof, it should be understood that other embodiments may fall within the spirit and scope of the invention, as defined by the following claims.

The invention claimed is:

1. A method of operating a disk drive, comprising:
   receiving an access command;
   determining a category of the access command based on a seek distance and an estimated extra latency for the access command;
   looking up a maximum seek velocity that corresponds to the determined category of the access command; and
   performing a seek operation in response to the access command and subject to the looked-up maximum seek velocity.

2. The method of claim 1, wherein the maximum seek velocity is looked up in a table that provides different respective maximum seek velocities for different seek distance/estimated extra latency categories of access operations.

3. The method of claim 1, wherein the seek distance is represented in terms of cylinder bands, and the estimated extra latency is represented in terms of servo ID bands.

4. The method of claim 1, wherein the access command is a read command.

5. The method of claim 1, wherein the access command is a write command.

6. The method of claim 1, further comprising selecting the access command from a command queue prior to the looking-up step.

7. The method of claim 6, wherein the access command is selected from the command queue in accordance with an SATF (shortest access time first) algorithm.

8. The method of claim 7, wherein the SATF algorithm takes into account an estimated probability that the access command can be performed within an estimated access time.

9. A method of operating a disk drive, comprising:
   storing a plurality of different maximum seek velocities in a table, the stored maximum seek velocities being indexed by parameters of access operations;
   receiving an access command;
   determining parameters of the received access command;
   selecting one of the stored maximum seek velocities from the table based on the determined parameters of the received access command; and
   performing a seek operation in response to the received access command and subject to the selected maximum seek velocity.

10. The method of claim 9, wherein the parameters of access operations and the determined parameters of the received access command include seek distance and estimated extra latency.

11. The method of claim 10, wherein the seek distance is represented in terms of cylinder bands, and the estimated extra latency is represented in terms of servo ID bands.

12. The method of claim 9, further comprising selecting the received access command from a command queue prior to the step of selecting one of the stored maximum seek velocities from the table.

13. The method of claim 12, wherein the received access command is selected from the command queue in accordance with an SATF algorithm.

14. The method of claim 13, wherein the SATF algorithm takes into account an estimated probability that the received access command can be performed within an estimated access time.

15. The method of claim 14, wherein the table stores data indicative of estimated probabilities that the access operations can be performed within respective estimated access times.

16. A method of establishing respective maximum seek velocities for categories of disk drive access commands, comprising:
   maintaining statistics for each of the categories of access commands, the statistics indicating a number of occasions on which access commands of the respective category were performed within an estimated access time and indicating a number of occasions on which access commands of the respective category failed to be performed within the estimated access time;
   deriving a performance rate for each category of access commands from the statistics for the respective category;
   performing an access operation associated with a specific one of the categories of access commands;
   comparing the performance rate for the specific one of the categories of access commands with a threshold; and
   determining whether to decrease, or determining whether to increase, a respective maximum seek velocity for the specific one of the categories of access commands based on a result of the comparing step.

17. The method of claim 16, wherein the categories of access commands are defined by seek distance and estimated extra latency.

18. The method of claim 16, wherein the statistics are used in connection with an SATF algorithm.

19. A method of establishing respective maximum seek velocities for categories of disk drive access commands, comprising:
   maintaining statistics for each of the categories of access commands, the statistics indicating a number of occasions on which access commands of the respective category were performed within an estimated access time and indicating a number of occasions on which access commands of the respective category failed to be performed within the estimated access time;
   deriving a performance rate for each category of access commands from the statistics for the respective category;
   performing an access operation associated with a specific one of the categories of access commands;
   determining that the access operation was performed within an estimated access time;
   comparing the performance rate for the specific one of the categories of access commands with a threshold; and determining whether to decrease a respective maximum seek velocity for the specific one of the categories of access commands based on a result of the comparing step.

20. A method of establishing respective maximum seek velocities for categories of disk drive access commands, comprising:

maintaining statistics for each of the categories of access commands, the statistics indicating a number of occasions on which access commands of the respective category were performed within an estimated access time and indicating a number of occasions on which access commands of the respective category failed to be performed within the estimated access time;

deriving a performance rate for each category of access commands from the statistics for the respective category;

performing an access operation associated with a specific one of the categories of access commands;

determining that the access operation was not performed within an estimated access time;

comparing the performance rate for the specific one of the categories of access commands with a threshold; and determining whether to increase a respective maximum seek velocity for the specific one of the categories of access commands based on a result of the comparing step.

21. An apparatus for controlling a seek speed of a head actuator in a disk drive, comprising:

a memory device storing a plurality of different maximum seek velocities in a table, the stored maximum seek velocities being indexed by parameters of access operations; and a head control circuit adapted to:
  receive an access command;
  determine parameters of the received access command;
  select one of the stored maximum seek velocities from the table based on the determined parameters of the received access command; and
  control a seek operation in response to the received access command and subject to the selected maximum seek velocity.

22. The apparatus of claim 21, wherein the parameters of access operations and the determined parameters of the received access command include seek distance and estimated extra latency.

23. The apparatus of claim 22, wherein the seek distance is represented in terms of cylinder bands, and the estimated extra latency is represented in terms of servo ID bands.

24. A memory device storing a maximum seek velocity table, the table containing a plurality of cells, each of the cells holding a maximum seek velocity value for constraining execution of a category of access commands corresponding to the respective cell, the cells being defined by a plurality of estimated extra latency bands and a plurality of seek distance bands.

* * * * *